United States Patent Office 2,997,484
Patented Aug. 22, 1961

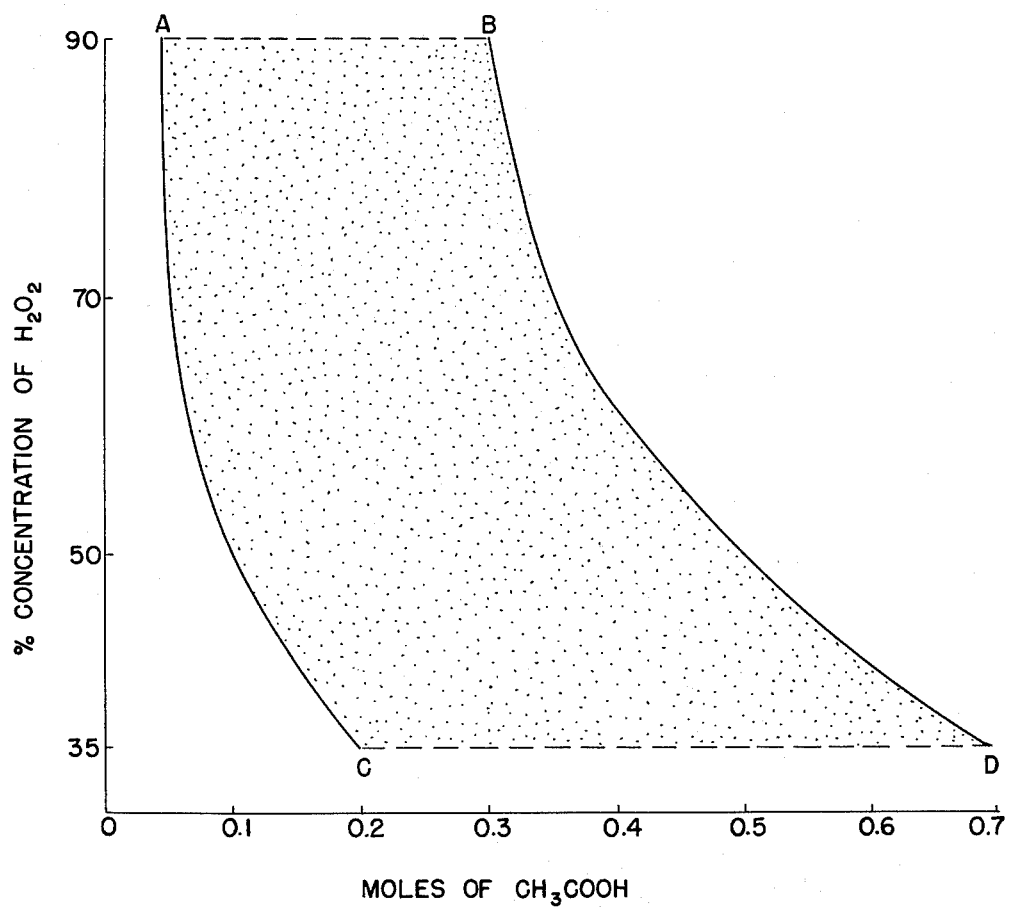

2,997,484
METHOD OF EPOXIDATION OF UNSATURATED ESTERS
Ellington M. Beavers, Stanley P. Rowland, and Ralph G. White, Philadelphia, Pa., assignors to Rohm & Haas Company, Philadelphia, Pa., a corporation of Delaware
Filed Aug. 30, 1954, Ser. No. 452,998
8 Claims. (Cl. 260—348.5)

This invention relates to an improved process of epoxidizing water-insoluble unsaturated esters whereby oxygen atoms are added to the esters at those points originally occupied by double bonds. It relates to the preparation of esters which contain one or more epoxy groups attached to the carbon atoms originally joined by double bonds in either the alcohol moieties of the esters or the acid moieties of the esters or both. More particularly, it relates to a process of epoxidizing esters of unsaturated vegetable fatty acids, especially of oleic, linoleic, and linolenic acids, or the esters of unsaturated long chain alcohols.

Epoxidation of such esters by means of performic acid or peracetic acid has been described heretofore, for example, in U.S. Patents 2,458,484, 2,485,160, 2,567,930 and 2,569,502 and in journal articles including an article by Greenspan and Gall (Industrial and Engineering Chemistry, vol. 45, No. 12, pp. 2722–2726 (December 1953)).

An object of this invention is to provide an economical, safe, and efficient process of epoxidizing unsaturated esters with peracetic acid. Another object is to provide a process which does not require the separate formation of peracetic acid.

Epoxidized esters, such as are prepared by the process of this invention, are widely used as stabilizers and plasticizers for a variety of organic plastic materials, such as polyvinyl chloride, copolymers of vinyl chloride and vinyl acetate, and chlorinated rubber.

The process of this invention comprises reacting a water-insoluble unsaturated ester with an aqueous mixture of hydrogen peroxide, acetic anhydride, and/or acetic acid, and an auxiliary acidic agent. The reaction can be carried out at temperatures from about 10° C. to the boiling point of the aqueous mixture (about 100° C.), but in commercial production it is much preferred to operate from room temperature (about 20° C.) to about 80° C. It is much preferred that a solvent for the ester be employed. Suitable solvents include hydrocarbons such as benzene, toluene, xylene, heptane and octane as well as chlorinated liquids such as ethylene dichloride and carbon tetrachloride.

Peracetic acid is formed in the aqueous mixture and it is believed that it is this peracetic acid which enters the organic ester phase and is responsible for the epoxidation of the double bonds in the ester.

Either acetic acid or acetic anhydride or mixtures of the two can be used. For purposes of this invention one mole of acetic anhydride is equivalent to two moles of acetic acid. It is very important that the proper amount of acetic acid and/or acetic anhydride be employed. If too little is used, the rate of reaction is undesirably slow while if too much is used, the epoxidized product is contaminated with an hydroxy-acetoxy by-product. The minimum amount of either the acid or the anhydride which is used is that quantity equivalent to 0.05 mole of acetic acid for each double bond in each mole of ester. That is to say, the minimum amount is that quantity which is equivalent to 0.05 mole of acetic acid per mole of unsaturation in the ester. The maximum amount which is recommended is that quantity which is equivalent to 0.7 mole of acetic acid for every double bond in one mole of the ester. The amount of acetic acid and/or anhydride which is required is dependent, however, upon the concentration of the aqueous solution of hydrogen peroxide which is employed. For example, when a 35% solution of hydrogen peroxide is used, the amount of acetic compound should be equivalent to 0.2 to 0.7 mole of acetic acid for each double bond in each mole of unsaturated ester. On the other hand, when a 90% aqueous solution of hydrogen peroxide is used, the amount of acetic compound should be equivalent to 0.05 to 0.3 mole for each double bond in each mole of unsaturated ester. Intermediate concentrations of hydrogen peroxide require intermediate ratios of the acetic compound.

In the accompanying drawing, there are plotted the allowable maximum and minimum molar ratios of the acetic compound, calculated as acetic acid, to double bond in the ester against the initial concentration by weight of hydrogen peroxide in the solution thereof used. The stippled area within the lines drawn between points A, B, C, and D is therefore a measure of the required ratios of the acetic compounds as dependent upon the concentration by weight of hydrogen peroxide in said solution. Consequently the over-all ratio of acetic acid or acetic anhydride which is used is from 0.05 to 0.7 mole, calculated as acetic acid, for each double bond in each mole of ester, with the proviso that the ratio of acetic compound to concentration by weight of hydrogen peroxide in the solution thereof used must correspond to a point within the area bounded by the lines drawn between points A, B, C, and D.

The amount of hydrogen peroxide which is employed should be at least one mole for each double bond in each mole of ester. This minimum amount of hydrogen peroxide is required because the peroxide is the ultimate source of the oxygen atom which forms the three-membered epoxide group or oxirane ring with the two carbon atoms joined by the original double bond. Thus, for example, in the epoxidation of an oleic acid ester of a saturated monohydric alcohol or in the case of an oleyl alcohol ester of a saturated lower fatty acid one mole of hydrogen peroxide is required for complete epoxidation since there is one double bond in each ester or, expressed another way, since there is one mole of unsaturation. Furthermore, two moles of hydrogen peroxide are required to epoxidize completely one mole of a linoleic ester of a saturated monohydric alcohol because linoleic acid contains two double bonds. The same minimum amount, two moles, is needed to epoxidize one mole of an oleyl ester of a saturated dicarboxylic acid. Ordinarily, an excess of hydrogen peroxide is employed. An excess of about 0.1 mole over the minimum amount of one mole, which is required by theory, is usually adequate; but the excess may be as much as a full mole, thus making the recommended ratio of peroxide from one to two moles per mole of unsaturation.

Commercial grades of hydrogen peroxide containing 35% to 90% by weight of hydrogen peroxide are used, although it is much preferred to use the grades which contain at least 50% hydrogen peroxide. The more concentrated solutions of hydrogen peroxide are used at the lower temperatures and/or with lower ratios of the acetic compound while the more dilute solutions are employed at the higher temperatures in conjunction with the larger ratios of the acetic acid or anhydride.

The aqueous mixtures of hydrogen peroxide and acetic acid and/or acetic anhydride which are employed have a pH of +1.0 to −1.0 by virtue of containing, in addition to the acetic acid and/or anhydride, an auxiliary ionizable acidic agent. The following are typical acidic materials which have been used successfully and advantageously: inorganic acids such as phosphoric, sulfuric, hydrochloric, nitric, and boric acids; acid-forming salts such as sodium acid sulfate, potassium acid sulfate, potassium persulfate and zinc chloride; organic sulfonic acids such as toluene sulfonic and methane sulfonic acids; strong carboxylic acids such as maleic, fumaric and oxalic acids; and acidic esters such as ethyl di-acid phosphate, isopropyl di-acid phosphate, mono- and di-methyl sulfate. In this process, an auxiliary acidic agent is always used in conjunction with the acetic acid and/or anhydride and the latter are used in the lowest amount which is commensurate with a fast rate of epoxidation.

The auxiliary acidic agent must ionize in the aqueous medium so that, together with the acetic acid, it provides a pH within the range of +1.0 to −1.0. It is also important that the auxiliary acidic agent have little, if any, solubility in the organic ester phase, i.e., that it be essentially insoluble in the ester being epoxidized. Therefore, the inorganic acidic agents are recommended over the organic acidic materials. This is because organic acidic agents, such as maleic acid or oxalic acid, which are more soluble than inorganic compounds in the organic phase, tend to react with the epoxy compounds and to convert them to hydroxy and/or acyloxy derivatives, which, in view of the objects of this invention, are undesirable. Currently, phosphoric acid and sulfuric acid, particularly the former, are much preferred over all of the wide variety of acidic agents which have been employed.

The epoxidation reaction proceeds much more smoothly and more rapidly when the aqueous phase contains the auxiliary acidic agent as well as the peroxide and the acetic acid and/or acetic anhydride and when it has a pH within the range of +1.0 to −1.0 than when the pH is outside this range and when the auxiliary acidic agent is omitted. The epoxidation of the ester starts almost immediately on contact of the ester with the aqueous solution. Then the reaction progresses rapidly and smoothly and it does not become dangerously exothermic at any time. Not only are the smoothness, safety and efficiency of the reaction increased by the use of the auxiliary acidic agent which imparts a pH of +1.0 to −1.0 to the solution of hydrogen peroxide and acetic acid and/or acetic anhydride, but the product contains a high ratio of oxirane oxygen, a low amount of residual unsaturation, and a minimum amount of hydroxy and/or acyloxy substituents. Thus by the use of the auxiliary acidic agent, the efficiency of the entire operation of producing epoxidized esters is increased.

The process of this invention applies to the esters of water-insoluble, aliphatic, unsaturated acids and it is particularly suitable for the epoxidation of the esters of those higher olefinically unsaturated fatty acids which occur in natural vegetable oils. The most important of the unsaturated fatty acids are oleic, linoleic and linolenic acids. The esters which are epoxidized by the process of this invention are those of the monohydric and polyhydric alcohols typified by the following: mono-, di-, and tri-substituted carbinols, such as ethyl, isopropyl, n-butyl, sec-butyl, tert-butyl, tert-amyl, n-octyl, 2-ethyl-hexyl, octadecyl, lauryl, cyclohexyl and benzyl alcohols; polyhydric alcohols such as ethylene glycol, 1,2-propylene glycol, 2-ethylhexanediol-1,3, butanediol-1,2; butanediol-1,3, butanediol-1,4, dodecanediol-1,12; polyalkylene glycols such as di- and tri-ethylene glycols; glycerol; pentaerythritol; and the isomers and homologues of the above. Esters of a mixture of alcohols are likewise readily epoxidized by this process such as mixtures of ethyl oleate and butyl oleate, or of benzyl linoleate and cyclohexyl linoleate, or of octyl oleate and dodecyl linoleate, or of octyl linolenate and dodecyl linolenate, et cetera. Not only are mixtures of esters operable in the process of this invention but mixed esters of the acids may also be used and converted to epoxidized materials. Semi-drying and drying vegetable oils are examples of naturally occurring mixed glyceryl esters of oleic, linoleic and linolenic acids which can be most advantageously epoxidized. The semi-drying oils are essentially mixed glyceryl esters of oleic, linoleic and saturated monocarboxylic acids, notably stearic acid, and when these are epoxidized according to the instant process, the double bonds in the glycerol-esterified oleic and linoleic acids are converted to epoxide groups; and the presence of the esterified saturated acids has no apparent effect on the course of the epoxidation reaction. Drying oils contain, in addition to esterified oleic and linoleic acid, triply-unsaturated esterified linolenic acid. Such oils are also included within the scope of this invention. Vegetable oils which are successfully epoxidized by the instant process include the following: soybean, corn, cottonseed, safflower, sunflower, sessame, poppyseed, walnut, peanut, linseed and perilla oils.

The average amount of unsaturation in the esters which determines the amount of peroxide and acetic acid and/or acetic anhydride to be used is ordinarily known or can be readily determined by standard methods, such as a determination of the bromine-number or the iodine-number. The esters of substituted alcohols, such as the esters of polyalkylene glycols—particularly polyethylene glycols—which contain only inert substituents and which are not reactive with the aqueous peroxidic mixture, may be epoxidized by this process. Esters of aromatic alcohols, such as benzyl alcohol, which are free of aliphatic or non-benzenoid unsaturation are also included within the scope of this invention. A preferred class of esters, however, which are operable herein are those in which the alcohol moiety is that of an unsubstituted and aliphatically saturated alcohol; viz., the alkanols, alkanediols, alkanetriols, and alkanetetrols.

The process of this invention has been applied equally well to the epoxidation of esters of unsaturated acids other than oleic, linoleic and linolenic acids. It is a particularly effective process for the epoxidation of esters of water-insoluble, olefinically unsaturated, aliphatic acids including the following: undecylenic, myristolenic, palmitolenic, petroselic and erucic acids.

As indicated above, this process also applies to those esters which are olefinically unsaturated in the alcohol portion of the ester. Currently the greatest use of epoxy compounds is as softeners or plasticizers for plastic materials. Consequently, the epoxidation of the esters of long chain alcohols is of greatest interest. Such esters are those of oleyl, linoleyl and linolenyl alcohols. The esters of these alcohols can be obtained in pure form. However, for the production of esters on an industrial scale the commercial grades can be used. In fact, the esters of the so-called "oil alcohols" are readily epoxidized by the instant process. The oil alcohols, themselves, are available and are made by the reduction of esters of mixed fatty acids of vegetable oils by means of sodium and an alcohol such as ethanol or butanol. Thus, esters such as the acetates, propionates and butyrates of the oil alcohols obtained by the reduction of fatty acid esters of common oils such as soybean, linseed, safflower, cottonseed and perilla oils are readily converted to epoxy derivatives by the process of this invention. It is evident that the resultant products are mixtures of epoxidized esters; but, as such, they serve excellently as stabilizers and plasticizers.

Furthermore, the instant process applies equally well to esters of the unsaturated acids and unsaturated alcohols mentioned above. Such esters, which are unsaturated in both the acid and alcohol moieties, are typified by the following: oleyl oleate, oleyl linoleate, oleyl linolenate, linoleyl linolenate, linoleyl linoleate, linolenyl oleate, linolenyl linoleate, linolenyl linolenate, and the like. Also operable are the esters of oil alcohols and vegetable fatty acids, such as the esters of soybean alcohols and soybean fatty acids.

It is evident that the instant process can be applied to a wide variety of unsaturated esters, all of which are insoluble in water. Of greatest interest, however, are the alkanol, alkanediol, alkanetriol and alkanetetrol esters of oleic, linoleic and linolenic acids and mixtures thereof, including vegetable oils, on the one hand, and the oleyl, linoleyl and linolenyl alcohol esters of aliphatic acids on the other, including fatty acid esters of oil alcohols.

In the process of this invention it is preferred that the hydrogen peroxide, acetic acid and/or acetic anhydride, and the auxiliary acidic agent be added to the ester simultaneously and at such a rate that the temperature can be held within the desired range. Alternatively the reactants can be added portionwise in the proper ratios so that the pH of the aqeuous phase is within the limits of +1.0 to −1.0. A very satisfactory method—particularly where tons of esters are involved—is to add the reactants to the ester in about nine equal portions at intervals of about 30 minutes. Reactivity is usually manifested by a rise in temperature of the reaction mixture; and external heating may be reduced or discontinued since the exothermic nature of the reaction is ordinarily sufficient to maintain the desired temperature once it is attained. In the case of the more reactive esters, it is sometimes necessary to employ conventional cooling means. It is inadvisable to pre-mix the hydrogen peroxide and the acetic anhydride or acid. After all of the reactants have been added, the reaction mixture is stirred at the elevated temperature until epoxidation is essentially complete. A period of about three hours is usually adequate at temperatures within the range of 50° C. to 80° C. The cooled reaction mixture is next separated into an aqueous phase and an organic phase, the latter being the epoxidized ester. The rate of separation is greatly increased by the presence of a water-immiscible liquid which is a solvent for the epoxidized ester. An organic liquid, such as toluene, is good for this purpose. The separated organic phase is washed thoroughly with a neutralizing solution such as a solution of sodium bicarbonate and water, and is then stripped by distillation of any organic liquid which may have been used.

Substantially the same rapid rate of reaction is realized when the peroxidic mixture is added slowly and continuously over approximately the same length of time as is required to add aliquot portions. Furthermore, essentially the same results are obtained when the hydrogen peroxide, acetic acid and/or acetic anhydride and acidic agent are added individually and simultaneously or when the acidic agent is mixed with either the peroxide or the acetic acid and/or anhydride. What is essential to the success of this process is that the aqueous solution contain acetic acid and/or acetic anhydride, hydrogen peroxide and an auxiliary acidic agent when it is reacted with the unsaturated ester and that it have a pH value of +1.0 to −1.0. During the epoxidation reaction, the pH of the aqueous peroxide mixture in contact with the organic ester rises slowly but it is desirable that the pH not be allowed to exceed a value of +1.5 since the rate of epoxidation slows down unnecessarily and objectionably.

The following examples serve to illustrate the process of this invention as applied to typical unsaturated esters.

*Example 1*

Into a reactor equipped with stirrer, thermometer and reflux condenser was charged 188 grams of soybean oil (equivalent to 1 mole of unsaturation) and 188 grams of toluene. The solution was stirred and heated to 70° C. Over a period of 4.5 hours there were added individually 88.4 grams (1.3 moles) of a 50% aqueous solution of hydrogen peroxide, 17 grams of acetic anhydride (0.167 mole equivalent to 0.33 mole of acetic acid) and 5.99 grams (0.05 mole) of 85% phosphoric acid in 10 equal portions of each reactant at intervals of about 30 minutes. The temperature was maintained at 70° to 75° C. After a total reaction time of 10 hours, 100 grams of water was added. The aqueous phase was separated and the organic phase was washed with three 200 gram-portions of water. The volatile material—chiefly water and toluene—was removed by distillation to 100° C. and 1 mm. of pressure. The product had a viscosity of 3.4 poises, an oxirane oxygen-content of 5.6%, an iodine number of 0.95, and an acid number of 0.8. The product was extremely compatible with polyvinyl chloride and had a real plasticizing effect together with a stabilizing effect—particularly on exposure to light and heat.

*Example 2*

This example serves to illustrate the advantage gained by employing an auxiliary acidic agent. Two epoxidation reactions were carried out in the same manner except that phosphoric acid was employed as an auxiliary agent in one run and omitted from the other. The same procedure was followed as is described in Example 1; and the following amounts of materials were employed: 845 grams of soybean oil, 76.5 grams of acetic anhydride (equivalent to 0.167 mole per mole of unsaturation), and 397 grams (equavalent to 1.3 moles per mole of unsaturation) of a 50% aqueous solution of hydrogen peroxide. In one run 27 grams of 85% phosphoric acid was included (equivalent to 0.05 mole per mole of unsaturation). The reaction mixture, maintained at 70 to 75° C. throughout, was sampled periodically, and the iodine number of the organic phase and the pH of the aqueous phase were measured. The iodine is a measure of the degree of epoxidation. Following is a tabulation of the results:

| Time In Hours | Blank (No $H_3PO_4$) | | Run Containing $H_3PO_4$ | |
| --- | --- | --- | --- | --- |
| | $I_2$ No. | pH | $I_2$ No. | pH |
| 0 | 135 | +0.7 | 135 | −0.6 |
| 2¼ | 117 | +0.84 | 94 | −0.1 |
| 4½ | 102 | +0.84 | 42 | +0.2 |
| 7½ | 90 | +0.99 | 6.6 | +0.5 |
| 12 | 74 | +1.23 | 0.7 | +0.88 |

*Example 3*

In this example, the process of Example 1 was followed with the exception that acetic acid was employed instead of acetic anhydride. Thus 20 grams of the acid (0.33 mole) replaced the 17 grams of acetic anhydride. For comparison, a second reaction was carried out from which the auxiliary acidic agent ($H_3PO_4$) was omitted.

The course of the two reactions was followed as in the case of Example 2 and the results are here tabulated:

| Time In Hours | Blank (No H₃PO₄) | | | Run Containing H₃PO₄ | | |
|---|---|---|---|---|---|---|
| | I₂ No. | Percent Oxirane O₂ | pH | I₂ No. | Percent Oxirane O₂ | pH |
| 0 | 135 | 0 | +0.53 | 135 | 0 | −0.41 |
| 2¼ | 128 | 0 | +0.58 | 107 | 1.2 | −0.22 |
| 4½ | 113 | 0.51 | +0.60 | 57 | 3.8 | 0.0 |
| 7½ | 62 | 1.2 | +0.72 | 20 | 5.4 | +0.31 |
| 8½ | 38 | 1.6 | +0.86 | 6.3 | 6.0 | +0.48 |

Example 4

The general procedure of Example 1 was followed in the preparation of 2-ethylhexyl epoxystearate from 2-ethylhexyl oleate. A total of 197 grams (0.5 mole) of 2-ethylhexyl oleate dissolved in 125 grams of octane, 44.2 grams (0.65 mole) of a 50% aqueous solution of hydrogen peroxide, 8.5 grams (0.083 mole) of acetic anhydride and 3.45 grams (0.03 mole) of 85% phosphoric acid were employed. The other reactants were added to the 2-ethylhexyl oleate in 8 equal portions of each over a period of four hours while the temperature was maintained at 60° to 70° C. Thereafter the reaction mixture was held at 60° to 70° C. for five additional hours. The epoxidized product had an oxirane oxygen-content of 3.25%, an iodine number of 1.3 and an acid number of 0.8. It was compatible with polyvinyl chloride, acid number of 0.8. It was compatible with polyvinyl chloride, copolymers of vinyl chloride and vinylidene chloride, and chlorinated rubber; and it served as a plasticizer and stabilizer for these materials.

Example 5

Safflower seed oil was epoxidized by the general procedure described above. Thus, 175 grams of oil (equivalent to one mole of unsaturation), dissolved in 90 grams of benzene was reacted with 53.5 grams (1.1 moles) of 70% hydrogen peroxide solution, 4.3 grams of 85% phosphoric acid, and 11.8 grams (0.196 mole) of glacial acetic acid. The reactants were added to the oil over a period of 4 hours while the temperature was held at 70° to 75° C. and thereafter the reaction was continued for an additional four-hour period at 70° to 75° C. The epoxidized product was isolated in the manner described above and was found to have an oxirane oxygen-content of 5.8%, an iodine number of 20 and a viscosity of 3.2 poises. Like the other epoxidized products of this invention, it was an excellent plasticizer and stabilizer for polyvinyl chloride and chlorinated rubber.

Example 6

This example demonstrates the general utility of other auxiliary acidic agents which function in the same manner as the phosphoric acid employed in the above examples. In this case the procedure of Example 1 was followed except that the phosphoric acid was replaced by other acidic agents. The epoxidation reactions were interrupted after a total of 2¼ hours and the products were analyzed. Following is a tabulation of the results:

| Auxiliary Acidic Agent | Moles of Aux. Acid/double bond | pH of Aqueous phase | Percent Oxirane Oxygen |
|---|---|---|---|
| None | 0 | +0.84 | 0.5 |
| H₃PO₄ | 0.052 | −0.1 | 1.5 |
| Toluene Sulfonic acid | 0.02 | −0.1 | 1.35 |
| HBF₄ | 0.004 | −0.1 | 1.30 |
| KHSO₄ | 0.015 | −0.25 | 1.1 |

The pH values mentioned herein are those determined at 25° C. A very convenient method for determining negative pH values without the use of indicators, and which was adopted in the development of the instant invention, is carried out as follows: With a standard buffer having a real pH of 2.0 a Beckman pH meter (e.g. Model H-2 with 4990–83 glass electrode and 4970 reference electrode) is adjusted to read a pH of 5.0. The pH meter, thus adjusted to a "negative three scale," is used in the customary way and the values read therefrom are corrected by the addition of the value −3.0.

Example 7

To a reactor equipped with thermometer, agitator and reflux condenser was charged 118 grams (0.35 mole) of oleyl butyrate. To the stirred ester were added slowly and simultaneously 31 grams (0.455 mole) of a 50% solution of hydrogen peroxide, 2 grams of 85% phosphoric acid and 8.4 grams (0.14 mole) of acetic acid. The temperature was maintained within the range of 55° to 60° C. during the addition and for four hours thereafter. Then 100 ml. of toluene was added and the aqueous layer was removed. The organic phase was thoroughly washed with 100 ml. of water, then with 100 ml. of a saturated aqueous solution of sodium bicarbonate and again with 100 ml. of water. It was stripped of solvent by distillation up to 100° C./15 mm. The product, epoxystearyl butyrate had an oxirane oxygen-content of 4.0%, an iodine number of 2.7 and an acid number of 0.3.

The same procedure was followed in the preparation of the epoxidized ester of oleic acid and soybean oil alcohols, except that 74 grams of the ester was substituted for the oleyl butyrate above. The product which was compatible with polyvinyl chloride had an oxirane oxygen-content of 5.0%, an acid number of 0.5 and an iodine number of 2.

Example 8

The procedure of Example 1 was followed in the preparation of 2-ethylbutyl epoxystearate from 2-ethylbutyl oleate. A total of 183 grams (0.5 mole) of 2-ethylbutyl oleate dissolved in 190 grams of octane, 44.2 grams (0.65 mole) of a 50% aqueous solution of hydrogen peroxide, 8.5 grams (0.083 mole) of acetic anhydride and 3.45 grams (0.03 mole) of 85% phosphoric acid were employed. The other reactants were added to the 2-ethylbutyl oleate in 8 equal portions of each over a period of four hours while the temperature was mantaned at 60° to 70° C. Thereafter the reaction mixture was held at 60° to 70° C. for five additional hours. The epoxidized product had an oxirane oxygen-content of 3.8%, an iodine number of 2.1, and an acid number of 0.8.

We claim:

1. A process for epoxidizing water-insoluble esters of olefinically unsaturated higher fatty acids by the in situ technique which comprises reacting by mixing together, at a temperature from about 10° C. to about 100° C., said ester and an aqueous mixture containing (a) hydrogen peroxide introduced thereinto as an aqueous solution, (b) at least one member of the class consisting of acetic acid and acetic anhydride, and (c) phosphoric acid, said hydrogen peroxide being present in said aqueous mixture in an amount equal to at least one mole of hydrogen peroxide for each double bond in each mole of said ester, said member of the class being present in said aqueous mixture in an amount equivalent to 0.05 to 0.7 mole of acetic acid for each double bond in each mole of said ester and also in an amount which is related to the amount of hydrogen peroxide contained in the solution so introduced as will come within the area bounded by the lines drawn between points A, B, C, and D of the accompanying drawing, and said phosphoric acid being present in said aqueous mixture in an amount sufficient to bring the pH thereof within the range of +1.0 to −1.0.

2. The process of claim 1 in which said ester is an alkyl ester in which said alkyl group contains a maximum of 18 carbon atoms.

3. The process of claim 2 in which said alkyl ester is 2-ethylbutyl oleate.

4. The process of claim 1 in which said ester is a vegetable oil.

5. The process of claim 4 in which said vegetable oil is soybean oil.

6. The process of claim 4 in which said vegetable oil is safflower oil.

7. The process of claim 1 in which said ester is oleyl oleate.

8. In the process of epoxidizing esters of ethylenically unsaturated higher fatty acids, the alcohol moiety of each said esters being saturated, by means of acetic acid and hydrogen peroxide at moderate temperatures the improvement which consists in performing the reactance in the presence of a catalytic amount of phosphoric acid.

References Cited in the file of this patent

UNITED STATES PATENTS

| | | |
|---|---|---|
| 2,443,280 | Swern | June 15, 1948 |
| 2,458,484 | Terry et al. | Jan. 4, 1949 |
| 2,485,160 | Niederhauser | Oct. 18, 1949 |
| 2,543,419 | Niederhauser | Feb. 27, 1951 |
| 2,567,930 | Findley et al. | Sept. 18, 1951 |
| 2,676,131 | Soloway | Apr. 20, 1954 |
| 2,692,271 | Greenspan et al. | Oct. 19, 1954 |
| 2,801,253 | Greenspan et al. | July 30, 1957 |
| 2,813,878 | Wahlroos | Nov. 19, 1957 |

OTHER REFERENCES

Swern: Chem. Reviews 45: 3-7 (1948).
Swern: Chemical Reviews 45: 25 and 24 (1949).
Swern: J.A.C.S. 67: 1786-89.